United States Patent [19]
Kato et al.

[11] 3,886,592

[45] May 27, 1975

[54] SAFETY SWITCH DEVICE FOR A MAGNETIC RECORDING AND REPRODUCING APPARATUS OF THE SHEET TYPE

[75] Inventors: Saburo Kato, Yokohama; Takaji Sue, Tokyo; Tadanao Itoh, Tokyo, all of Japan

[73] Assignee: Ricoh Co., Ltd., Tokyo, Japan

[22] Filed: Sept. 7, 1973

[21] Appl. No.: 395,174

[30] Foreign Application Priority Data

Sept. 13, 1972 Japan ........................ 47-106848[U]

[52] U.S. Cl. .................... 360/75; 200/61.62; 274/2; 360/101

[51] Int. Cl. ......................... G11b 19/08; H01h 9/20

[58] Field of Search ........... 360/86, 97, 98, 99, 101, 360/75; 220/24.2, 55.3; 274/2; 200/61.62, 61.58 B, 61.83, 85; 274/4 H, 4 J

[56] References Cited

UNITED STATES PATENTS

| | | | |
|---|---|---|---|
| 3,322,427 | 5/1967 | Fujimoto | 360/107 |
| 3,655,926 | 4/1972 | Meermans | 200/61.62 |
| 3,742,162 | 6/1973 | Wasemann | 200/61.62 |
| 3,789,273 | 1/1974 | O'Brien | 360/97 |

*Primary Examiner*—Bernard Konick
*Assistant Examiner*—Jay P. Lucas
*Attorney, Agent, or Firm*—Cooper, Dunham, Clark, Griffin & Moran

[57] ABSTRACT

A device comprising a hook attached to a sheet hold-down plate of a magnetic recording and reproducing apparatus of the sheet type adapted to be moved between an open position and a closed position. The hook performs the functions of locking the sheet hold-down member in position when it is brought to its closed position and permitting a switch to be actuated to render a turntable with a magnetic head operative only when the hold-down plate is in its closed position and a magnetic sheet is placed on the turntable.

5 Claims, 6 Drawing Figures

Patented May 27, 1975

3,886,592

3 Sheets-Sheet 1

SAFETY SWITCH DEVICE FOR A MAGNETIC RECORDING AND REPRODUCING APPARATUS OF THE SHEET TYPE

BACKGROUND OF THE INVENTION

This invention relates to a safety switch device for a magnetic recording and reproducing apparatus of the sheet type.

In a magnetic recording and reproducing apparatus of the sheet type, a recording sheet is placed in a predetermined position on a top plate with its recording surface facing downwardly, and a magnetic head maintained in contact with the recording surface of the recording sheet is moved from the outer periphery of the recording sheet to its central portion by tracing a helical path of movement so as to perform a recording or playback operation. A conventional safety switch mechanism provided in the magnetic recording and reproducing apparatus of the type described is such that a pin operatively connected to a safety switch and projecting from the top plate is pushed inwardly to actuate the switch when a sheet hold-down plate is brought to a closed position. When the switch is inoperative or when the sheet hold-down plate is in an open position, the magnetic head is not rendered operative even if a recording and playback button is depressed. The conventional safety switch also performs the function of rendering the magnetic head inoperative when the sheet hold-down plate is opened while a recording or playback operation is being performed, so that the recording or playback operation is temporarily interrupted.

One disadvantage associated with this type of safety switch is that if the pin is inadvertently depressed by the finger or some other object with the sheet hold-down plate in its open position, the magnetic head begins to move irrespective of whether a recording sheet is disposed in the regular position on the top plate. This will lead to a serious accident. Since magnetic recording and reproducing apparatus of the sheet type are used widely nowadays by young people for entertainment and education purposes, it is desirable that the magnetic head be positively prevented from being rendered operative when the sheet hold-down plate is in the open position.

SUMMARY OF THE INVENTION

This invention has as one of its objects the provision of a safety switch device for a magnetic recording and reproducing apparatus of the sheet type which obviates the aforementioned disadvantage of the prior art.

Another object of the invention is to provide a safety switch device which permits a turntable to rotate only when the sheet hold-down plate is in a closed position and a recording sheet is mounted on a top plate of the magnetic recording and reproducing apparatus.

According to the invention, there is provided a safety switch device comprising a hook mounted on the sheet hold-down plate at its free end for both locking the sheet hold-down plate in its closed position and actuating a safety switch. The safety switch actuating position is disposed inside the recording and reproducing apparatus, so that the magnetic head is positively prevented from being rendered operative when the sheet hold-down plate is in its open position.

DESCRIPTION OF PREFERRED EMBODIMENTS

Figure 1:
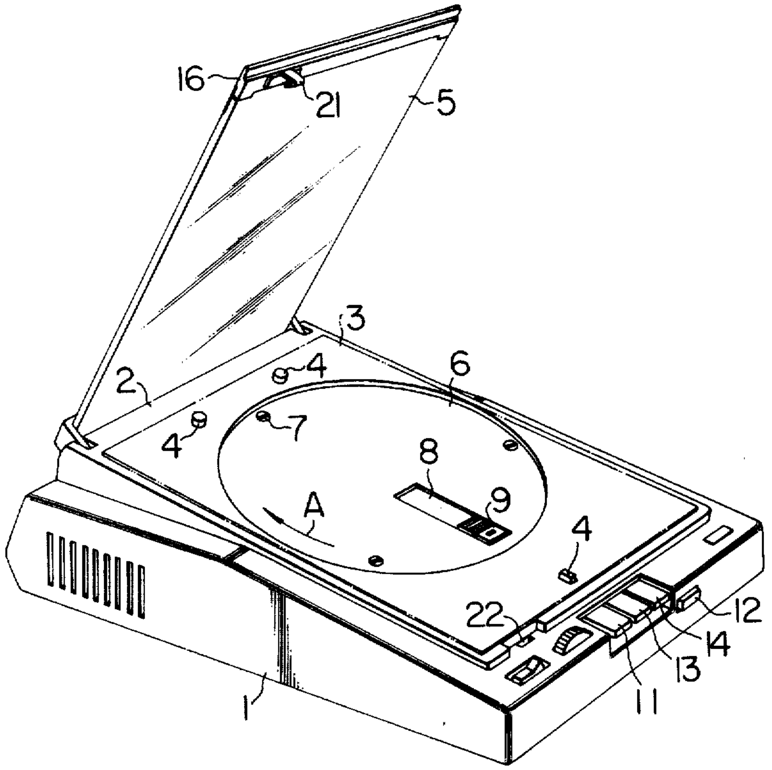
FIG. 1 is a perspective view of a magnetic recording and reproducing apparatus of the sheet type in which the invention can have application.

In FIG. 1, a recording sheet 3 is adapted to be placed on a top plate 2 of an outer casing 1 and held in a correct position by three set pins 4 of a relatively small length. A sheet hold-down plate 5 made of a transparent material is hingedly connected to one end edge of the outer casing for keeping the recording sheet 3 in place on the top plate 2 when the plate 5 is brought to a closed position.

A style disc 6 disposed in a large circular opening formed in the top plate 2 is substantially flush with the top plate 2 and secured by screws 7 to a turntable (not shown). The style disc 6 is formed therein with a radial slot 8 through which projects upwardly a magnetic head 9 mounted on the turntable. The magnetic head 9 moves in the direction of an arrow A together with the style disc 6 when it rotates in the normal direction and is moved by head moving means (not shown) from the outer peripheral portion of the sheet to the central portion thereof at a predetermined pitch. As a result, when the style disc 6 rotates, the magnetic head 9 moves toward the central portion of the style disc 6 while tracing a spiral track. By moving the magnetic head 9 along a spiral path while maintaining it in contact with the recording surface of the recording sheet 3, it is possible to record sound as electric signals on the recording sheet and reproduce the same.

The recording on the recording sheet 3 can be reproduced by depressing a playback button 11 and sound can be recorded on the recording sheet 3 by depressing both the play-back button 11 and a recording button 12. The playback operation and recording operation can be interrupted by depressing the playback button 11 again. Quick feed of the magnetic head can be effected by depressing a quick feed button 13 while the direction of movement of the magnetic head can be reversed by depressing a reverse movement button 14. Magnetic recording and reproducing apparatus constructed and operating as aforementioned are known from U.S. Pat. No. 3,596,914, for example, and need not be described herein in detail.

Figure 2:
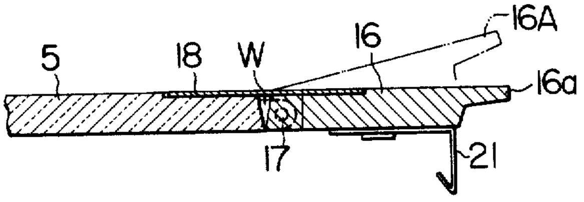
FIG. 2 is a sectional view of the sheet hold-down plate, showing its essential portions.

In FIG. 2, a handle 16 has a base hingedly connected at 17 to a free end of the sheet hold-down plate 5, and a plate spring 18 is secured to the sheet hold-down plate 5 to urge the handle 16 to move clockwise. The base of the handle 16 has a lower side edge brought into pressing engagement with the sheet hold-down plate 5 by the biasing force of the plate spring 18, so that a wedge-shaped gap W is formed between an upper side edge of the base of the handle 16 and the sheet hold-down plate 5. By moving the handle 16 at a free end 16*a*, it is possible to move the handle 16 to its upper position shown at 16A.

As shown in FIG. 2, a hook 21 for locking the sheet hold-down plate 5 in position is secured to the underside of the handle 16 and adapted to extend through an opening 22 (See FIG. 1) formed in the outer casing into the interior of the recording and reproducing apparatus when the sheet hold-down plate 5 is brought to a closed position.

Figure 3:
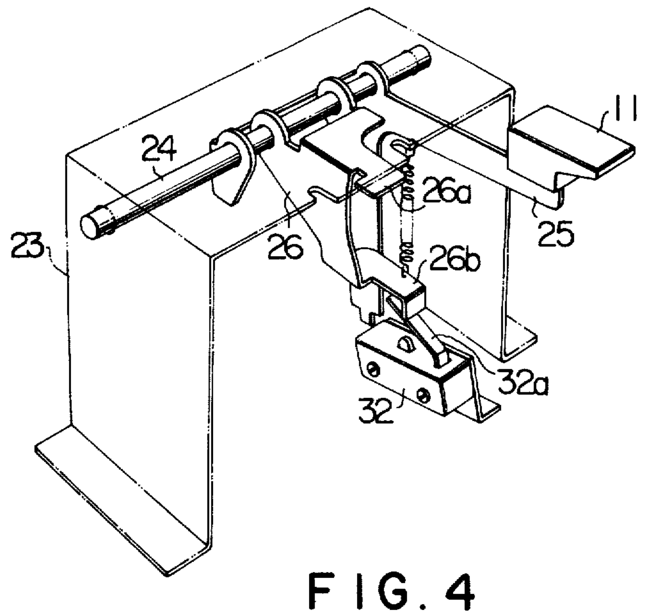
FIG. 3 is a perspective view of the safety switch device comprising one embodiment of the invention.
Figure 4:
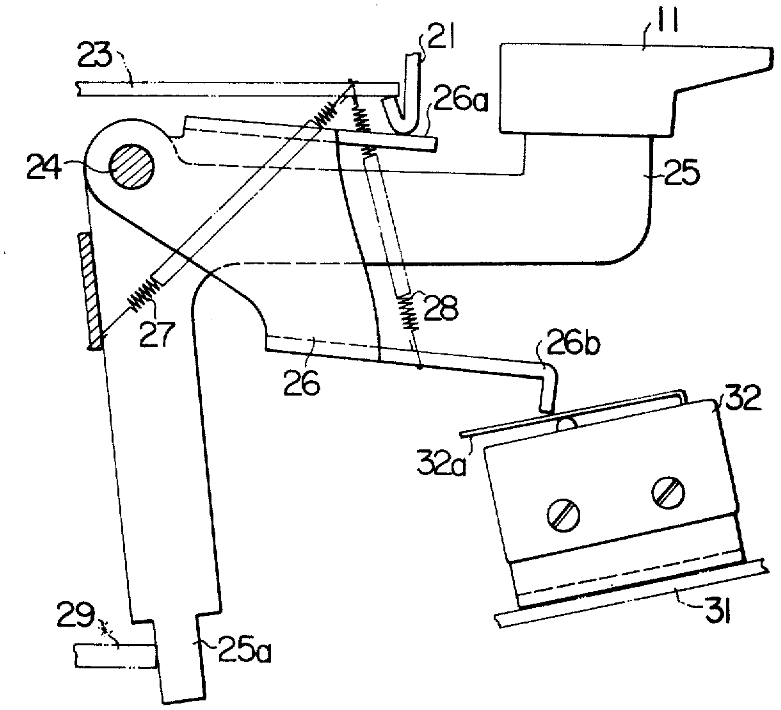
FIG. 4 is a sectional side view of the device shown in FIG. 3.

In FIG. 3, a shaft 24 is mounted at opposite ends on a holder member 23 having legs secured to a base plate (not shown). A lever 25 supporting the playback button 11 at a forward end and a lever 26 operatively engageable with a safety switch 32 at a forward end are pivotally supported at their bases by the shaft 24. As shown in FIG. 4, the lever 25 and switch lever 26 are urged to move counter clockwise about the shaft 24 in FIG. 4 by compression springs 27 and 28 connected at one end to the holder member 23 and at the other end to the levers 25 and 26 respectively. The counter clockwise movement of the lever 25 is precluded by having a free end 25*a* thereof abutting against the base plate while the counter clockwise movement of the switch lever 26 is limited by having a bent portion 26*a* thereof abutting against the support member 23. The switch lever 26 has a free end 26*b* which is positioned against an actuator 32*a* of the safety switch 32 which ensures that the sheet hold-down plate 5 is in its closed position when the magnetic head 5 is actuated. Stated differently, the magnetic head 9 is not rendered operative even though the playback button 11 is depressed unless the safety switch 32 is actuated. A slider 29 juxtaposed to the free end 25*a* of the lever 25 moves leftwardly when the playback button 11 is depressed so as to thereby rotate a turntable (not shown) on which the magnetic head 9 is mounted.

In FIG. 1, if the sheet hold-down plate 5 is brought to a closed position after the recording sheet 3 is placed in a predetermined position in the magnetic recording and reproducing apparatus, then the hook 21 is received in the opening 22. When the hook 21 is locked in place by the holder member 23 as shown in FIG. 4, it depresses the bent portion 26*a* and moves the switch lever 26 clockwise, so that the switch lever 26 depresses an actuator 32*a* at its free end 26*b* to actuate the safety switch 32. After the safety switch 32 is actuated, recording, playback and quick feed operations can be performed.

When the sheet hold-down plate 5 is brought to an open position, the handle 16 is brought to a phantom position shown at 16*a* in FIG. 2 in which the handle is inclined with respect to the plate 5, so that the hook 21 is unlocked from the holder member 23. Bringing the sheet hold-down plate 5 from its closed position to its open position results in the switch lever 26 being restored to its original position and the safety switch 32 being de-actuated. Thus the movement of the magnetic head 9 is interrupted at once when the sheet hold-down plate 5 is brought to its open position.

Figure 5:
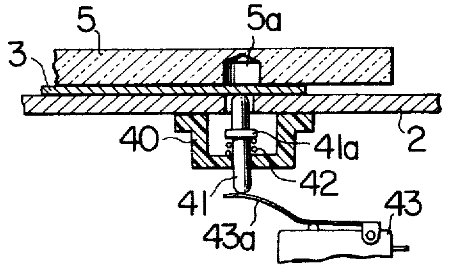
FIG. 5 PRIOR ART
FIG. 5 shows a safety switch of the prior art capable of detecting the presence or absence of a recording sheet on the recording and reproducing apparatus.

If the magnetic head 9 is actuated at all times when the playback button 11 is depressed with the sheet hold-down plate 5 in its closed position, the magnetic head would move idly while there is no recording sheet in the apparatus, so that the magnetic head would slide on the underside of the hold-down plate 5. This would cause damage both to the recording head and sheet hold-down plate. In order to obviate this disadvantage it has hitherto been customary to provide a safety switch which ensures that actuation of the magnetic head is precluded when no recording sheet is in the apparatus. FIG. 5 shows an example of this type of safety switch.

In FIG. 5, a recording sheet detecting pin 41 is slidably attached to a holder member 40 secured to the underside of the top plate 2 on which the recording sheet 3 is placed. An extension spring 42 is mounted between the holder member 40 and a flange 41*a* formed in the pin 41 having an upper end portion loosely extending through an opening formed in the top plate 2. An actuator 43*a* for a safety switch 43 is positioned against a lower end of the pin 41. When no recording sheet 3 is disposed on the top plate 2, the upper end portion of the pin 41 is received in a recess 5*a* formed on the underside of the sheet hold-down plate 5 and downward movement of the pin 41 is precluded. Thus the safety switch 43 is not actuated. If the sheet hold-down plate 5 is brought to a closed position with the recording sheet 3 on the top plate 2, then the pin 41 is moved downwardly by the recording sheet 3 as shown in FIG. 5, thereby depressing the actuator 43*a* and actuating the safety switch 43.

Even if the playback button 11 is depressed while the safety switch 43 is precluded from being actuated, it is not possible to actuate the magnetic head 9. As a result, if the safety switch 32 described previously with reference to FIG. 3 is connected in series with the safety switch 43, it would be possible to provide means whereby the magnetic head 9 is actuated only when the two conditions are satisfied of the recording sheet 3 being disposed on the top plate 2 and the sheet hold-down plate 5 being in its closed position.

Figure 6:
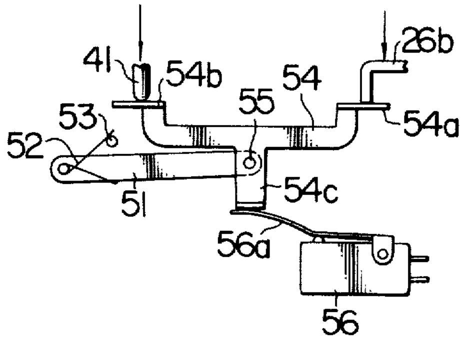
FIG. 6 is a side view of the safety device comprising another embodiment of the invention.

Such arrangement is shown in FIG. 6 in which one example of the mechanism in which one switch can perform the functions of two switches. As shown, a support lever 51 supported at its base by an immovable member (not shown) through a shaft is urged to move counter clockwise by the biasing spring of a torsion spring 52 into pressing engagement with an immovable stopper 53. An actuation lever 54 having actuators 54*a* and 54*b* at opposite ends thereof is connected through a shaft 55 to a free end of the support lever 51, with the actuator 54*a* being positioned against the free end 26*b* of the switch lever 26 (See FIG. 3) and the actuator 54*b* being positioned against a lower end of the pin 41 (See FIG. 5) for detecting the presence or absence of the recording sheet 3 on the top plate 2. The actuation lever 54 has a short arm 54*c* extending downwardly from the central portion of the lever 54 and positioned at its lower end against an actuator 56*a* for a safety switch 56.

If the sheet hold-down plate 5 is brought to its closed position with no recording sheet being disposed on the top plate 2, then downward movement of the pin 41 is precluded as aforementioned and the forward end portion of the switch lever 26 only moves downwardly. As a result, the actuation lever 54 moves clockwise in FIG. 6 and the short arm 54*c* moves out of the position in which it is positioned against the actuator 56*a*, so that the safety switch 56 is prevented from being actuated. On the other hand, if the sheet hold-down plate 5 is brought to its closed position with the recording sheet 3 being disposed on the top plate 2, the pin 41 and the free end 26*b* of switch lever 26 simultaneously move downwardly, so that the actuation lever 54 moves downwardly without pivoting. Thus the actuator 56*a* is depressed by the short arm 54*c* and the safety switch 56 is actuated. It will be appreciated that the safety switch 56 ensures that the magnetic head is actuated only when the sheet hold-down plate 5 is brought to its closed position when the recording sheet 3 is disposed on the top plate 2.

What is claimed is:

1. In magnetic recording and reproducing apparatus comprising a. a housing having an upper surface for supporting a magnetic recording sheet in a stationary position;
b. means for performing magnetic recording and reproducing operations on a downwardly facing surface of a recording sheet supported on said housing upper surface;
c. manually operable means for actuating said recording and reproducing means; and
d. a plate, having a first end hingedly connected to said housing and a second, free end, said plate being hingedly movable downwardly into and upwardly away from a sheet-holding position for overlying said housing upper surface to hold down a recording sheet disposed thereon;

the improvement which comprises:

e. a safety switch for permitting actuation of said recording and reproducing means by said manually operable means only when said safety switch is actuated;
f. a hook projecting downwardly from said plate adjacent the free end thereof;
g. said housing having an opening through which said hook projects when said plate is in sheet-holding position;
h. a member for engaging said hook within said opening to retain said plate in sheet-holding position; and
i. a lever mounted within and shielded from external manual access by said housing for actuating said safety switch and disposed to be engaged and moved by said hook, when said hook is inserted through said opening, to actuate said safety switch.

2. Apparatus as defined in claim 1, further including means for biasing said lever away from a safety-switch-actuating position such that the safety switch is actuated only while the hook projects through the opening.

3. Apparatus as defined in claim 2, wherein said plate comprises a major portion including said first end and a minor portion, including said second end and carrying said hook, hingedly connected to said major portion for pivoted movement relative thereto to facilitate disengagement of said hook from said member for release of said plate for upward movement.

4. Apparatus as defined in claim 2, further including an element disposed to project through said housing upper surface and movable between first and second positions depending on presence and absence, respectively, of a recording sheet on said upper surface; and wherein said lever bears a centrally pivoted arm having opposite ends respectively engageable by said hook and said element such that said lever is moved to switch-actuating position only when said element is in said first position and said hook is inserted in said opening at the same time.

5. In magnetic recording and reproducing apparatus comprising a. a housing having an upper surface for supporting a magnetic recording sheet in a stationary position;
b. means for performing magnetic recording and reproducing operations on a downwardly facing surface of a recording sheet supported on said housing upper surface;
c. manually operable means for actuating said recording and reproducing means; and
d. a plate, having a first end hingedly connected to said housing and a second, free end, said plate being hingedly movable downwardly into and upwardly away from a sheet-holding position for overlying said housing upper surface to hold down a recording sheet disposed thereon;

the improvement which comprises:

e. safety switch means for permitting actuation of said recording and reproducing means by said manually operable means only when said safety switch means is actuated;
f. a hook projecting downwardly from said plate adjacent the free end thereof;
g. said housing having an opening through which said hook projects when said plate is in sheet-holding position;
h. a member for engaging said hook within said opening to retain said plate in sheet-holding position;
i. an element movable between first and second positions in response to presence and absence, respectively, of a recording sheet on said housing upper surface; and
j. means, operatively engageable by said hook and said element, for actuating said safety switch means only in response to simultaneous occurrence of the two conditions that said element is in said first position and said hook is projecting through said opening.

* * * * *